United States Patent [19]
Robinson et al.

[11] Patent Number: 5,679,188
[45] Date of Patent: Oct. 21, 1997

[54] PNEUMATIC TIRE HAVING SPECIFIED BEAD STRUCTURE

[75] Inventors: Beale Anthony Robinson, North Canton; Keith Carl Trares, Akron; Thomas Reed Oare, Suffield; Randall Raymond Brayer, North Canton; Jeffrey Wayne Kahrs, Hartville, all of Ohio

[73] Assignee: The Goodyear Tire & Rubber Company, Akron, Ohio

[21] Appl. No.: 116,742

[22] Filed: Sep. 7, 1993

Related U.S. Application Data

[62] Division of Ser. No. 954,770, Sep. 30, 1992, Pat. No. 5,263,526.

[51] Int. Cl.$^6$ .................. B60C 15/02; B60C 15/024; B60C 15/04
[52] U.S. Cl. .................. 152/540; 152/539; 152/544; 152/379.3; 152/381.4; 152/DIG. 9
[58] Field of Search .................. 152/539, 544, 152/516, 379.3–379.5, 381.3–381.4, 540, DIG. 9; 245/1.5

[56] References Cited

U.S. PATENT DOCUMENTS

| | | |
|---|---|---|
| 1,294,161 | 2/1919 | Pratt . |
| 1,437,013 | 11/1922 | Pratt . |
| 1,485,864 | 3/1924 | Maranville . |
| 1,665,070 | 4/1928 | Pierce . |

(List continued on next page.)

FOREIGN PATENT DOCUMENTS

| | | |
|---|---|---|
| 486907 | 9/1977 | Australia . |
| 495698 | 8/1978 | Australia . |
| 58124 | 12/1980 | Australia . |
| 518813 | 11/1981 | Australia . |
| 780685 | 3/1968 | Canada . |
| 1164324 | 3/1984 | Canada . |
| 0005399 | 11/1979 | European Pat. Off. . |
| 0371755 | 6/1990 | European Pat. Off. . |
| 0475258 | 3/1992 | European Pat. Off. . |
| 0524561 | 1/1993 | European Pat. Off. . |
| 0524562 | 1/1993 | European Pat. Off. . |
| 0578216 | 1/1994 | European Pat. Off. . |
| 2201981 | 6/1973 | France . |
| 2287350 | 10/1975 | France . |
| 2350973 | 12/1977 | France . |
| 2374173 | 7/1978 | France . |
| 2389504 | 12/1978 | France . |
| 2395851 | 1/1979 | France . |
| 2403215 | 4/1979 | France . |
| 2206200 | 6/1994 | France . |
| 2501242 | of 0000 | Germany . |

(List continued on next page.)

OTHER PUBLICATIONS

The Akron Beacon Journal, Monday, Jun. 28, 1993, "The race to drive with a flat", by Stuart Drown.
The Akron Beacon Journal, Monday, Jun. 28, 1993, "Tire's not hole-proof, it's flat smart", by Stuart Drown.
Article published in the Akron Beacon Journal on Sep. 6, 1992 entitled "Race to Develop Tires that Run Flat Picks Up," by Jonathan Hicks.
European Search Report.
Sabath, D., "Tire makers unveil new 'run-flat' models", *The Plain Dealer*, Aug. 6, 1992.

*Primary Examiner*—Adrienne C. Johnstone
*Attorney, Agent, or Firm*—Roger D. Emerson

[57] ABSTRACT

A radial ply pneumatic tire features a bead core which comprises an arrangement of filaments positioned relative to one another. The bead core has a cross-section and radially inward base side, a radially outermost point or side or sides, an axially inward first side, and an axially outward second side. The base side of the bead core is substantially linear and has a width being between 50% to 75% of the rim seat width. An associated rim has a pair of humps and a rim flange associated with each hump. Each rim flange has an axially inward surface, the distance between each hump and the axially inward surface of the associated rim flange being a rim seat.

11 Claims, 3 Drawing Sheets

U.S. PATENT DOCUMENTS

| | | |
|---|---|---|
| 1,670,045 | 5/1928 | Pierce . |
| 1,914,040 | 6/1933 | Pierce . |
| 2,149,079 | 2/1939 | White et al. . |
| 2,869,610 | 1/1959 | Lippmann et al. . |
| 2,948,568 | 8/1960 | Hykes et al. ............... 152/381.4 X |
| 3,542,108 | 11/1970 | Rye . |
| 3,682,223 | 8/1972 | Simpson . |
| 3,707,177 | 12/1972 | Boileau . |
| 3,861,442 | 1/1975 | Bertrand . |
| 3,911,987 | 10/1975 | Takusagawa et al. . |
| 3,935,892 | 2/1976 | Arimura et al. . |
| 3,946,785 | 3/1976 | Powers et al. . |
| 3,954,131 | 5/1976 | Hoshino et al. . |
| 3,964,532 | 6/1976 | Harrington . |
| 3,983,919 | 10/1976 | Messerly . |
| 4,034,792 | 7/1977 | Martin ............................ 152/379.3 |
| 4,067,374 | 1/1978 | Alden et al. . |
| 4,142,567 | 3/1979 | Johannsen et al. . |
| 4,162,698 | 7/1979 | Merli et al. . |
| 4,177,851 | 12/1979 | Gill et al. ........................ 152/539 X |
| 4,180,116 | 12/1979 | Maiocchi et al. . |
| 4,193,437 | 3/1980 | Powell . |
| 4,202,393 | 5/1980 | Ikeda et al. . |
| 4,203,481 | 5/1980 | Ranik, Jr. . |
| 4,227,563 | 10/1980 | Grosch et al. . |
| 4,235,273 | 11/1980 | Edwards et al. . |
| 4,246,950 | 1/1981 | Welter ........................ 152/381.3 X |
| 4,261,405 | 4/1981 | Yamauchi et al. . |
| 4,265,288 | 5/1981 | Kaneko et al. . |
| 4,287,924 | 9/1981 | Deck et al. . |
| 4,319,622 | 3/1982 | Iuchi et al. . |
| 4,351,382 | 9/1982 | Corner et al. ............... 152/544 X |
| 4,365,659 | 12/1982 | Yoshida et al. . |
| 4,405,007 | 9/1983 | Welter . |
| 4,462,447 | 7/1984 | Siefert et al. ............... 152/539 X |
| 4,794,967 | 1/1989 | Charvet ........................ 152/544 X |
| 4,917,164 | 4/1990 | Ushikubo et al. . |
| 4,998,575 | 3/1991 | Kanamaru . |
| 5,010,938 | 4/1991 | Assaad et al. . |
| 5,058,649 | 10/1991 | Hoang et al. . |
| 5,131,445 | 7/1992 | Tokieda et al. . |
| 5,145,536 | 9/1992 | Noma et al. . |
| 5,205,883 | 4/1993 | Kanamaru . |
| 5,263,526 | 11/1993 | Oare et al. . |

FOREIGN PATENT DOCUMENTS

| | | |
|---|---|---|
| 1913238 | 9/1969 | Germany . |
| 3924619 | 2/1990 | Germany . |
| 57-158105 | 9/1982 | Japan . |
| 4-221209 | 8/1992 | Japan . |
| A45494 | 4/1964 | Luxembourg . |
| 1056771 | 1/1964 | United Kingdom . |
| 1423401 | 10/1973 | United Kingdom . |
| 1522843 | 8/1978 | United Kingdom . |
| 2033316 | 10/1978 | United Kingdom . |
| 2087805 | 6/1982 | United Kingdom . |
| 2138367 | 10/1984 | United Kingdom . |
| 8706889 | 11/1987 | WIPO ................................ 152/544 |

PNEUMATIC TIRE HAVING SPECIFIED BEAD STRUCTURE

This is a division, of application Ser. No. 07/954,770 filed Sep. 30, 1992, now U.S. Pat. No. 5,263,526.

BACKGROUND OF THE INVENTION

1. Field of Invention

The present invention relates generally to pneumatic tires, and more specifically to pneumatic tires designed to remain affixed to and in operative association with the vehicle wheel even upon deflation of the tire. Some varieties of these tires include devices designed to support the vehicle when the tire loses inflation pressure. Such tires are commonly known as "run flat" tires.

2. Description of the Prior Art

One basic problem with pneumatic tires is that the performance of the tires depends on the retention of pressurized air within the tire. Upon a condition where the pressurized air in the tire escapes, such as when the tire is punctured by a nail or other road hazard, performance of the tire can diminish rapidly. In most cases, the vehicle can only be driven a very short distance before it becomes inoperable.

Because of this deficiency, tire designers have long sought to develop a tire able to provide good driving characteristics and performance even upon deflation of the tire.

One of the key problems in providing such continued performance upon deflation is that of retaining the tire to the wheel. Since the tire is normally retained on the wheel by the pressurized air within the tire pushing the beads and sidewalls of the tire outwardly against a rim flange, the escape of the pressurized air through puncture or other road hazard eliminates the inner pressure. Absent this pressure, the tire tends to become disconnected and disassociated from the wheel and control of the vehicle becomes more difficult.

Previous efforts to address this deficiency have required a special wheel/tire combination. For various reasons this solution has not proven to be acceptable. One of the chief reasons for the ineffectiveness of the solution is the high cost of the special wheels which were required. These tire/wheel combinations have typically cost several times the cost of the typical tire and wheel combination. Other tire/wheel combinations required special mounting procedures and/or equipment. As such, they have never been commercially acceptable.

There was perceived a need for a new tire which could stay connected to a conventional wheel, even in a deflated condition, without the requirement of a special wheel. In other words, a tire which could be mounted to any conventional wheel but which would be retained upon the wheel upon tire deflation and would continue to provide acceptable driving performance for an acceptable distance.

Efforts by others to address this need include European Patent application 0 475 258 A1, U.S. Pat. No. 5,131,445, U.S. Pat. No. 3,954,131, U.S. Pat. No. 4,193,437, U.S. Pat. No. 4,261,405, and European Patent application 0 371 755 A2.

In addition, several other attempts have sought to develop a bead configuration having certain advantageous properties and configurations. For example, in U.S. Pat. No. 4,203,481 a run flat tire is disclosed which is to be used in association with a special rim. In U.S. Pat. No. 1,914,040, a tire bead is disclosed having a rectangular configuration. Further, in U.S. Pat. No. 1,665,070, a tire bead is disclosed having a triangular configuration.

In commonly-owned application Ser. No. 07/954,209, now U.S. Pat. No. 5,368,082, which is incorporated here by reference, an innovative runflat device utilizing the herein disclosed inventive bead core is disclosed.

SUMMARY OF THE INVENTION

The present invention relates to a pneumatic tire which can be used on a conventional wheel and which will be retained on the wheel even upon deflation of the tire. The inventive tire is a vulcanized radial ply pneumatic tire having a pair of axially spaced beads. At least one radial ply extends between the beads and is turned radially outwardly around the beads. The tire has a toroidal shape. Each of the beads has a substantially inextensible bead core which comprises a coil of round metal wire filaments or a single continuous filament which, in the toroidally-shaped tire prior to its vulcanization, has a polygonal cross-sectional area defined by imaginary lines segments contacting the outer surfaces of the outer filaments or filament windings in the bead core. The bead core is further characterized by the polygonal cross-sectional area having a radially-inward base side the base side having a first edge, a second edge and a length, a radially outward point or side, a first side and a second side. The first and second sides extend from the base side toward the radially outermost point or side. The first side intersects the base side at a first edge to form an included acute angle α. The second side intersects the base side at a second edge to form an included acute angle β, with α being greater than or equal to β.

According to another aspect of the invention, the inventive tire can be used in connection with a rim having a flange and a hump. A bead heel surface on the tire can be configured to have a length between 85% and 100% of the distance W between the hump and an axially inward surface of the flange, contributing to the tire remaining on the wheel during a deflated condition. Wire filaments or filament windings in a first layer of the bead core can be configured so that a relatively wide, stiff first layer can be constructed, further contributing to the retention of the tire on the wheel during a deflated tire condition.

BRIEF DESCRIPTION OF THE DRAWINGS

Other aspects of the invention will become apparent from the following descriptions when read in conjunction with the accompanying drawings wherein.

DESCRIPTION OF THE PREFERRED EMBODIMENT

Invention also may be better understood in the context of the following definitions, which are applicable to both the specification and to the appended claims:

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial-Ply tire" means a belted or circumferentially-restricted pneumatic tire in which the ply cords which extend from bead to bead are laid at cord angles between 65 degrees and 90 degrees with respect to the equatorial plane of the tire.

"Equatorial plane (EP)" means the plane perpendicular to the tire's axis of rotation and passing through the center of its tread.

"Carcass" means the tire structure apart from the belt structure, tread, under tread, and side wall rubber over the sides, but including the bead.

"Belt structure" means at least two layers or plies of parallel cords, woven or unwoven, underlying the tread, unanchored to the bead and having both left and right cord angles in the range from 17 degrees to 27 degrees with respect to the equatorial plane of the tire.

"Sidewall" means that portion of the tire between the tread and the bead.

"Tread" means a molded rubber component which when, bonded to a tire casing, includes that portion of the tire that comes into contact with the road when the tire is normally inflated and under normal load.

"Tread width" means the arc length of the tread surface in the axial direction, that is, the plane passing through the axis of rotation of the tire.

"Section width" means the maximum linear distance parallel to the axis of the tire and between the exterior of its sidewalls when and after it has been inflated at normal pressure for 24 hours, but unloaded, excluding elevations of the sidewalls due to labeling, decorations, or protective bands.

"Section height" means the radial distance from the nominal rim diameter to the maximum outer diameter of the tire at the road contact surface nearest its equatorial plane.

"Aspect ratio" of the tire means the ratio of its section height to its section width.

"Axial" and "axially" are used herein to refer to the lines or directions that are parallel to the axis of rotation of the tire.

"Radial" and "radially" are used to mean directions radially toward or away from the axis of rotation of the tire.

"Inner" means toward the inside of the tire.

"Outer" means toward the tire's exterior.

Figure 1:
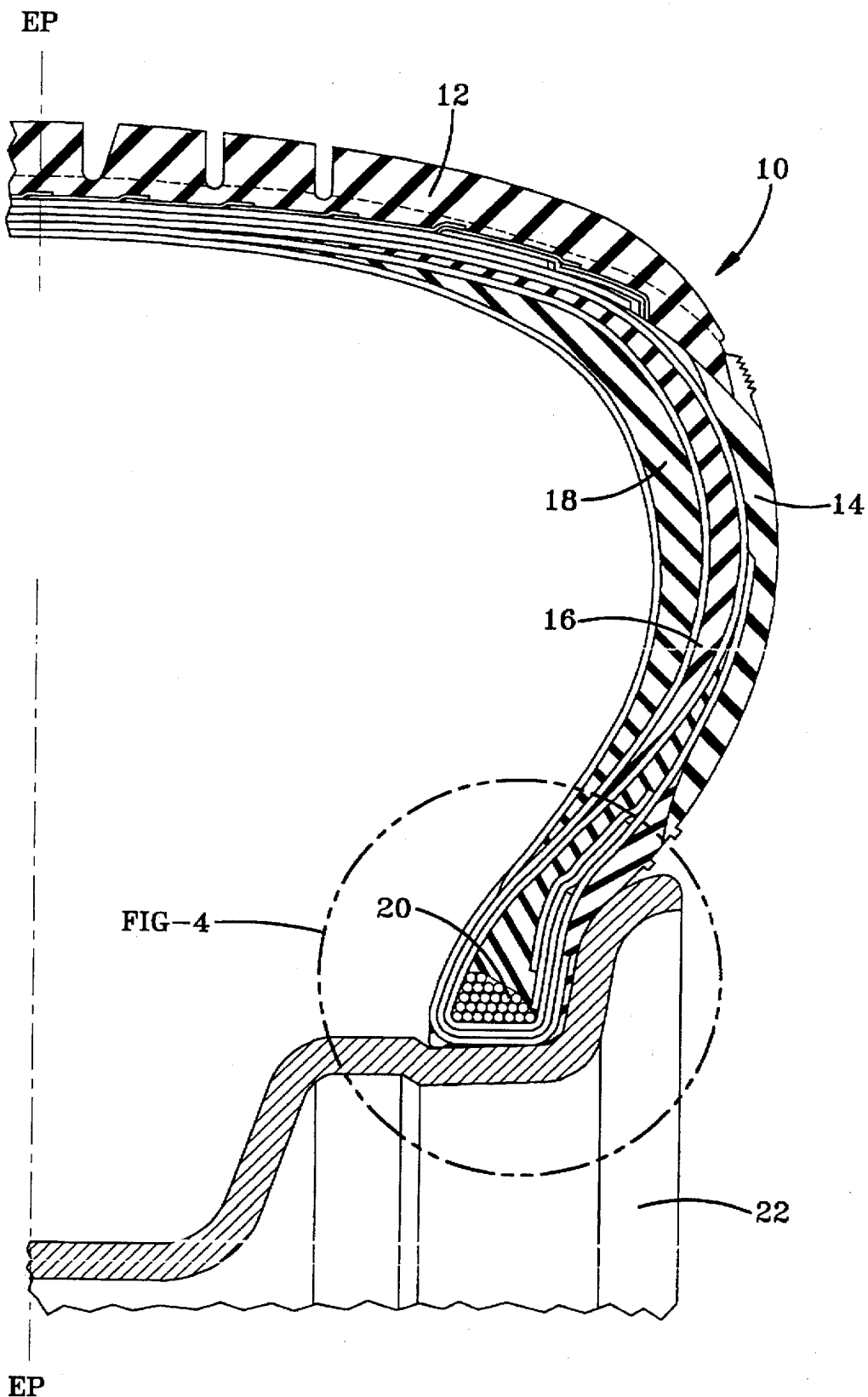
FIG. 1 is a cross-sectional view of one half of a tire according to the invention, the tire being cut along its equatorial plane.
Figure 4:
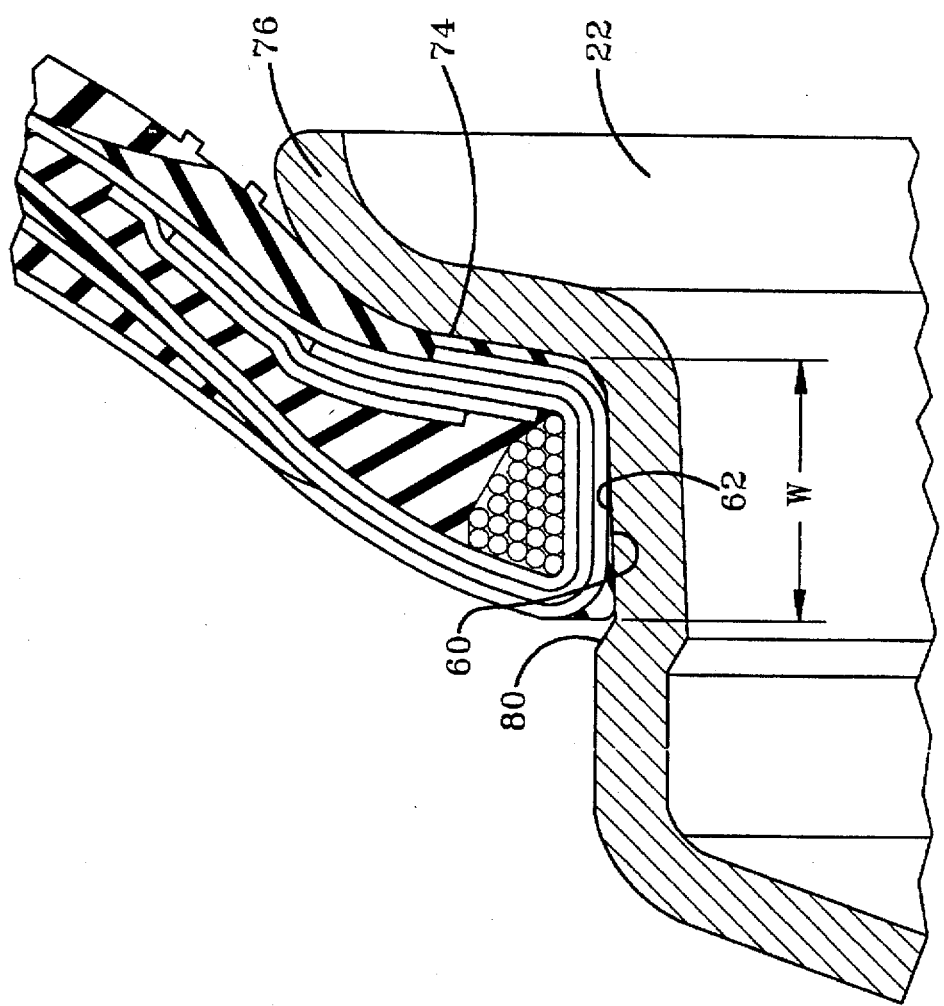
FIG. 4 is an enlarged cross-sectional view of a portion of FIG. 1 showing the bead core and bead area of the tire as it fits onto an associated wheel rim; and, FIG. 5 is a partial cross-sectional view of a design rim onto which the tire 10 can be mounted.
Figure 5:
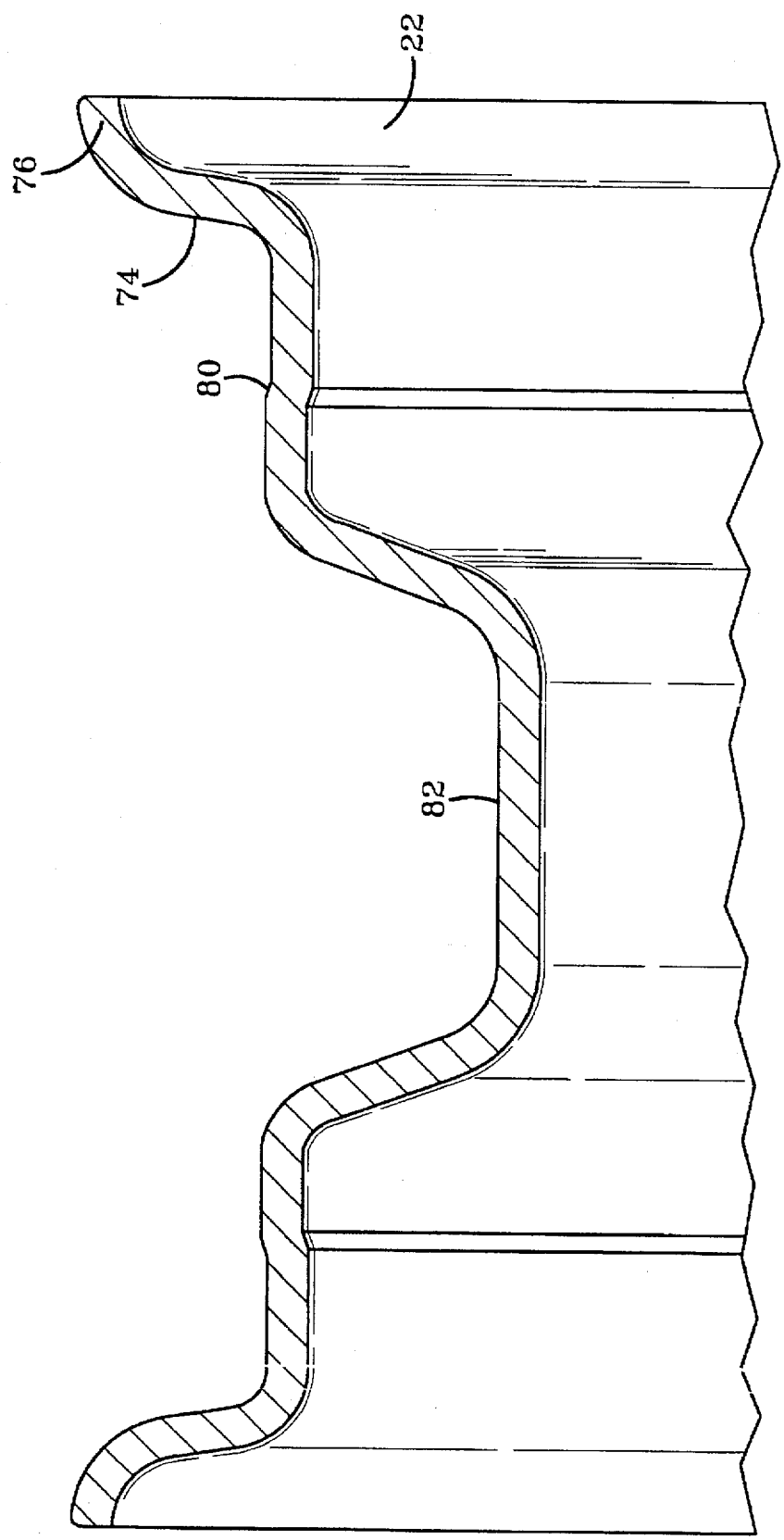

In the drawings the same numbers are used for the same components or items in the several views. With particular reference now to FIG. 1, there is illustrated a pneumatic tire 10. The preferred embodiment of the invention has been successfully incorporated into passenger car tires of size P255/45ZR17 and P285/40ZR17 although it is believed the invention is applicable to other types and sizes of tires. The pneumatic tire 10 comprises a tread 12, sidewalls 14, a carcass 16, and a pair of annular tensile members, commonly referred to as bead cores 20. In the preferred embodiment, the tire 10 includes a runflat device 18 in the sidewalls of the tire 10. It is believed that a tire incorporating the hereafter disclosed invention will remain in operative association with the vehicle wheel and rim whether or not a runflat device 18 is present in the tire. For ease of illustration, only one half of the tire 10 is shown, with the tire being split along its equatorial plane EP. With reference to FIGS. 4 and 5, the tire 10 fits onto and works in conjunction with an associated design wheel or rim 22, which will be discussed later in this disclosure.

Figure 2:
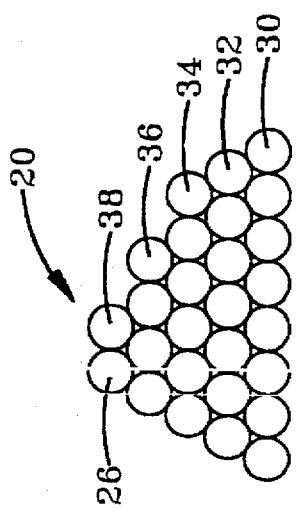
FIG. 2 is a cross-sectional view of a bead core according to the invention.

With reference to FIG. 2, a preferred arrangement of bead core filaments or filament windings is shown. The bead core 20 is shown in cross-section in FIG. 2 and comprises a series of wire filaments 26. The bead core 20 is preferably comprised of a single continuous filament which is repeatedly annularly wound into an annulus. In other words, each of the filaments 26 shown in cross-section in FIG. 2 are filament windings of the same continuous filament wound into the bead core 20. Although a single continuous filament is the preferred embodiment of the invention, it is believed the invention can be successfully practiced in the case of separate, discrete filaments wound into a similar annular configuration. One common such configuration is known as "strap beads."

The term "filaments 26" as used in the description of the present invention indicates either filament windings of a single continuous filament or a plurality discrete filaments wound into an annular configuration.

In the preferred embodiment, the filaments are comprised of a single strand of 0.050 inches (0.127 cm) diameter wire which is individually coated with 0.005 inches (0.0127 cm) of elastomeric material. Therefore, the preferred embodiment filament 26 has an overall diameter of 0.060 inches (0.1524 cm). The filaments 26 may have an overall diameter of between 0.095 inches (0.114 cm) and 0.080 inches (0.203 cm).

In the preferred embodiment, the bead core 20 comprises five layers 30,32,34,36,38 of filaments 26. The first layer 30 is the most radially inward layer and comprises eight filaments 26. The first layer 30 has a first width of between 0.395 inches (1.003 cm) and 0.592 inches (1.504 cm).

The second layer 32 is radially outward of the first layer 30 and comprises seven filaments 26. It is important that the filaments of adjoining layers, 30, 32, be "nested" together. In other words, the filaments 26 are offset axially by a distance equal to one half the diameter of a filament 26 so that the radially inwardmost portion of the outer surfaces of the filaments 26 in the second layer 32 lie radially inwardly of the radially outwardmost portion of the outer surface of filaments 26 in the first layer 30. The second layer 32 has a second width of between 0.350 inches (0.889 cm) and 0.500 inches (1.270 cm).

Figure 3:
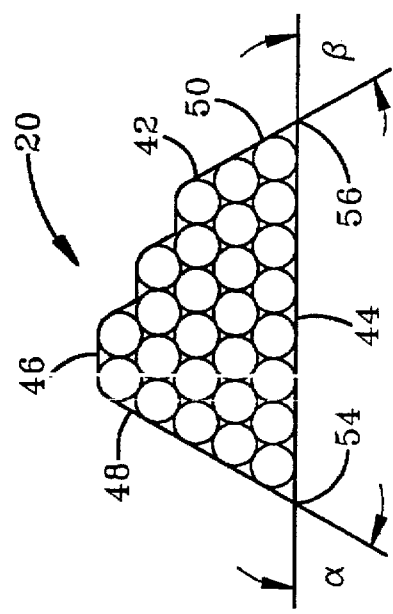
FIG. 3 is a schematic view of the cross-sectional bead core of FIG. 2 with line segments drawn to show the perimeter, angles, and geographical characteristics of the bead core of FIG. 2.

The third layer 34 comprises six filaments, the fourth layer 36 comprises four filaments and the radially outwardmost layer, the fifth layer 38, comprises two filaments. As can be seen best in FIGS. 2 and 3, the two filaments 26 of the fifth layer 38 are offset toward the first side 48 of the bead core 20. The third layer 34 has a third width of between 0.300 inches (0.762 cm) and 0.450 inches (1.143 cm), the fourth layer 36 has a fourth width of between 0.200 inches (0.508 cm) and 0.350 inches (0.889 cm), and the fifth layer 38 has a fifth width of between 0.100 inches (1.254 cm) and 0.250 inches (0.635 cm).

The bead core 20 has a perimeter 42. The perimeter 42 comprises the lengths of imaginary line segments contacting and tangent to outer surfaces of a base side 44, a radially outermost point or side 46, a first side 48, and a second side 50. The radially outermost point or side 46 can have a variety of configurations without significantly affecting the performance of the inventive bead core 20. For example, the bead core 20 could take the form of an isosceles triangle or the top surface of a rhombus. In the first case, the radially outermost surface 46 would take the form of a line (or a point in cross-section).

The base side 44 is the radially innermost side of the bead core 20 and is approximately parallel to the tire's axis of rotation as well as the mating surface of the wheel 22. In the preferred embodiment, the first side 48 is axially inward of the second side 50, although the relative orientation of the first and second sides 48,50 is not believed to be critical for the successful practice of the invention.

The first side 48 extends between the base side 44 and the radially outermost point or side 46 and intersects the base side 44 at a first edge 54. The first side 48 intersects the base side 44 to form an included acute angle $\alpha$.

The second side 50 extends between the base side 44 and radially outermost side 46 and intersects the base side 44 at a second edge 56, forming thereby an included acute angle $\beta$. In the preferred embodiment, angle $\alpha$ is greater than or equal to $\beta$.

The perimeter 42 of the bead core 20 defines a cross-sectional area of the bead core. The area of the inventive bead core 20 is less than the area of an isosceles triangle having acute angles equal to $\alpha$. Further, the area of the bead core 20 is less than the area of a trapezoid having angles $\alpha$ and $\beta$ and a height equal to the distance from the base side 44 of the bead core 20 to an imaginary line parallel to the base side 44 and tangent to the radially outermost filament 26 in the cross-section of the bead core 20. In the preferred embodiment, the bead core perimeter 42 has at least five sides, with the longest side being the base side 44.

In the preferred embodiment, the length of the base side of the bead core 20 is between 0.3 inches (0.762 cm) and 0.65 inches (1.651 cm). In the preferred embodiment, the length of the base side 44 of the bead core 20 is 0.48 inches (1.2192 cm).

With reference to FIG. 4, the tire 10 has a bead area which includes a bead heel surface 60. The bead heel surface 60 cooperates with the associated wheel 22. An important aspect of the invention is that the wheel 22 is the conventional, design rim as specified for the tire by industry standards, such as the *Tire and Rim Association Yearbook*, which is incorporated herein by reference. For example, the wheel used with the preferred embodiment of the tire in the sizes referred to earlier (i.e., P255/45ZR17) is a drop center, 5 degree "J" rim as specified in the *Tire and Rim Association Yearbook*.

The wheel 22 comprises an axially inner surface 74 of the rim flange 76. The wheel 22 also comprises a safety hump 80 which lies axially inwardly of the rim flange 76. The distance, between the safety hump 80 and the axially inner surface 74 of the rim flange 76 is referred to herein as the rim seat 62 and has a width equal to a distance W. The distance W is a standard for the various wheels designed for various vehicles. This information has been standardized in the industry and is obtainable from the *Tire and Rim Association Yearbook*. In the design wheels to be used with the preferred embodiment of the inventive tire, W is equal to 0.790 inches (2.0066 cm).

With continuing reference to FIG. 4, the tire 10 has a bead area which includes a bead heel surface 60. The bead heel surface 60 cooperates with and is the point of interface with the wheel 22. In the preferred embodiment of the invention, the width of the bead heel surface 60, measured in the axial direction, is substantially equal to but not greater than the distance W between the hump 80 and the axially inner surface 74 of the rim flange 76. This area of the wheel 22 will be herein referred to as the rim seat 62. The width of the bead heels of prior art tires were significantly smaller than the inventive bead heel 60. The configuration of the bead core 20, along with the increased width of the bead heel surface 60, causes the tire 10 to remain in operative association with the wheel 22, even in situations where such operative association is uncommon, such as deflation of the tire 10.

Through testing of various designs, the applicant has learned that one the key elements of the tire/wheel design which keeps the tire 10 affixed to the wheel 22 in cases of tire deflation is the design of the base side 44 of the bead core 20 and the bead heel surface 60.

One of the key elements of the design is the relationship of the width of the bead heel surface 60 to the distance W between the hump 80 and the axially inner surface 74 of the wheel rim flange 76. Prior art designs allowed for significant variation in the two dimensions, allowing for some slippage of the bead heel surface 60 of the tire 10 relative to the rim seat 62 of the wheel 22. For example, the width of the bead heel surface 60 of one relevant prior art design was 0.650 inches (1.651 cm). The bead heel surface 60 of the inventive tire has a width of 0.750 inches (1.905 cm). The area of the wheel 22 between the axially inward surface 74 of the rim flange 76 and the hump 80 is referred to herein as the rim seat 62. Since the width of the rim seat 62 (the distance W) is 0.790 inches (2.0066 cm), the preferred tire 10 has a bead heel width equal to 95% of the distance W. It is believed that the width of the bead heel surface 60 must be between 85% and 100% of the distance W for the tire 10 to remain on the wheel 22 upon tire deflation. By filling, or nearly filling, the width of the rim seat 62 with the bead heel surface 60 the axially inwardmost portion of the bead heel surface 60 never begins to ride over the hump 80, at any point around the circumference of the bead heel 60. For the rim seat width of 0.790 inches (2.0066 cm) the bead heel surface 60 could be for example between 0.700 inches and 0.790 inches, or between 89% and 100% of the distance W/.

Another important element of the successful inventive tire 10 is the width of the first layer 30 of the bead core 20. Relevant prior art designs used first layers 30 of widths of 0.276 inches (0.70104 cm) while the width of the first layer 30 of the inventive bead core 20 is 0.480 inches (1.2192 cm). Since the width of the rim seat (i.e. "W") is 0.790 inches (2.0066 cm), the width of the first layer 30 is 61% of W. It is believed that the width of the first layer 30 of the bead core 20 must be between 50% and 75% of the distance W.

Another important aspect of the bead core 20 is the linearity of the first layer 30. By configuring the filaments 26 of the first layer 30 so that their axial centerlines lie in a common plane, the compressive force between the first layer 30 and the rim seat 62 is approximately uniform, more uniform than was possible in prior art designs. The approximately uniform stress between the first layer 30 and the rim seat 62, tends to secure the bead heel surface 60 to the rim seat 62.

Another important aspect of the inventive design is the dimensional integrity of the bead core 20. Analysis of cut cured tire sections indicate that first layer 30 of the bead core 20 retains its linearity throughout the vulcanization process. Prior art bead cores 20 often deform when the carcass 16 "turns up" during the tire building and vulcanization process. The filaments 26 in the inventive bead core 20 are of a larger diameter (0.050 inches) (0.127 cm) than is typical (i.e., 0.037 inches) (0.09398 cm) in relevant prior designs. It is believed the larger diameter filaments 26 contribute to the dimensional stability of the bead core 20. Another important element to the dimensional stability is the continuous filament 26 of the bead core 20, as compared with the prior art strap beads. The first layer 30 is configured to be approximately parallel to the tire's axis of rotation and/or the rim seat 62. In the preferred wheel, a 5 degree, drop center "J" rim, as per the 1990 *Tire and Rim Association Yearbook*, the first layer 30 is parallel to the rim seat 62, which in turn makes an angle of 5 degrees with the tire's axis of rotation.

FIG. 5 shows a rim 22 having a drop center 82, as is known in the art. The inventive tire 10 mounts onto a typical drop center rim 22 as any conventional prior art tire would. No special wheels or rims are required, nor are any special mounting procedures.

It is also believed that the innovative tire 10 disclosed herein will be retained on the wheel 22 with nearly any effective design of a runflat device 18. Although the runflat device 18 disclosed is effective and is preferred, the bead design disclosed herein should work with other runflat devices.

Based on the foregoing description of the invention, what is claimed is:

1. In combination, a radial ply pneumatic tire and a rim, the tire comprising:

a pair of axially-spaced bead cores;

a carcass having at least one radial ply, the at least one ply having a central portion and lateral edge portions, each lateral edge portion being folded axially and radially outwardly around one of the bead cores; and, a pair of bead heel surfaces, each bead heel surface being radially inward of one of the bead cores and interfacing with an associated wheel rim, the bead heel surface having a width;

and the rim comprising a pair of humps and a rim flange associated with each hump, each rim flange having an axially inward surface, the distance between each hump and the axially inward surface of the associated rim flange being a rim seat, the width of each bead heel surface being between 85% and 100% of the width of the associated rim seat; and, each of the bead cores comprising wire filaments or filament windings positioned relative to one another to form a base side, a radially outermost point, side or sides, and first and second sides extending between the base side and radially outermost point, side or sides, each base side being substantially linear, the width of the base side being between 50% to 75% of the rim seat width.

2. The radial ply pneumatic tire and the rim of claim 1 wherein the width of each bead heel surface is between 0.700 inches (1.78 cm) and 0.790 inches (2.01 cm).

3. The radial ply pneumatic tire and the rim of claim 1 wherein each bead heel surface extends approximately parallel to the base side of said one of the bead cores.

4. The radial ply pneumatic tire and the rim of claim 3 wherein the wire filaments or filament windings of the base side of each of the bead cores are positioned side by side so that their axial centerlines at any point along the bead core lie in a single plane, such that the bead heel surface presses radially inwardly against the associated rim seat along its length with approximately uniform force.

5. The radial ply pneumatic tire and the rim of claim 1 wherein the filaments or filament windings have a diameter between 0.045 inches (0.114 cm) and 0.080 inches (0.203 cm).

6. The radial ply pneumatic tire and the rim of claim 1 wherein the wire filaments or filament windings of which each of the bead cores is comprised are windings of a continuous wire filament which is repeatedly annularly wound into each bead core, each bead core having a first layer of filament windings, the first layer forming the base side of each bead core.

7. The radial ply pneumatic tire and the rim of claim 6 wherein in each bead core the first layer filament windings are positioned side by side so that their axial centerlines at any point along the bead core lie in a single plane, each filament winding having a diameter between 0.045 inches (0.114 cm) and 0.080 inches (0.203cm).

8. The radial ply pneumatic tire and the rim of claim 1 wherein the wire filaments or filament windings of which each of the bead cores is comprised are a plurality of wire filaments wound into each bead core, each bead core having a first layer of filaments, the first layer forming the base side of each bead core.

9. The radial ply pneumatic tire and the rim of claim 8 wherein the first layer of filaments has a first width between 0.395 inches (1.003 cm) and 0.592 inches (1.504 cm) and each bead core further comprises:

a second layer of filaments, the second layer of filaments being located radially outwardly of the first layer of filaments, the second layer of filaments having a second width between 0.350 inches (0.889 cm) and 0.500 inches (1.270 cm);

a third layer of filaments, the third layer of filaments being located radially outwardly of the second layer of filaments, the third layer of filaments having a third width between 0.300 inches (0.762 cm) and 0.450 inches (1.143 cm);

a fourth layer of filaments, the fourth layer of filaments being located radially outwardly of the third layer of filaments, the fourth layer of filaments having a fourth width between 0.200 inches (0.508 cm) and 0.350 inches (0.889 cm); and, a fifth layer of filaments, the fifth layer of filaments being located radially outwardly of the fourth layer of filaments, the fifth layer of filaments having a fifth width between 0.100 inches (0.254 cm) and 0.250 inches (0.635 cm).

10. The radial ply pneumatic tire and the rim of claim 1 wherein the rim is the design rim for the tire.

11. The radial ply pneumatic tire and the rim of claim 1 wherein the rim is a drop center 5 degree "J" rim.

* * * * *